(12) United States Patent
Tanaka

(10) Patent No.: US 12,151,666 B2
(45) Date of Patent: Nov. 26, 2024

(54) VEHICLE DRIVING APPARATUS

(71) Applicant: SUBARU CORPORATION, Tokyo (JP)

(72) Inventor: Motohiro Tanaka, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/585,162

(22) Filed: Feb. 23, 2024

(65) Prior Publication Data

US 2024/0300469 A1 Sep. 12, 2024

(30) Foreign Application Priority Data

Mar. 6, 2023 (JP) ................................. 2023-033941

(51) Int. Cl.
*B60W 10/02* (2006.01)
(52) U.S. Cl.
CPC ......... *B60W 10/02* (2013.01); *B60W 2520/10* (2013.01); *B60W 2710/029* (2013.01)
(58) Field of Classification Search
CPC ............. B60W 10/02; B60W 2520/10; B60W 2710/029
See application file for complete search history.

(56) References Cited

U.S. PATENT DOCUMENTS 9,834,204 B2 * 12/2017 Kim ...................... B60W 10/02

FOREIGN PATENT DOCUMENTS

| CN | 107218389 A | * | 9/2017 | ........... F16D 48/064 |
| FR | 2974868 A1 | * | 11/2012 | ............. F16D 48/06 |
| GB | 2164408 A | * | 3/1986 | ............. B60K 17/28 |
| JP | H05178110 A | * | 7/1993 | |
| JP | 2004-245318 A | | 9/2004 | |
| JP | 2011-149515 A | | 8/2011 | |
| JP | 2020-122561 A | | 8/2020 | |

* cited by examiner

*Primary Examiner* — Justin Holmes
(74) *Attorney, Agent, or Firm* — TROUTMAN PEPPER HAMILTON SANDERS LLP

(57) ABSTRACT

A vehicle driving apparatus includes a friction clutch, a lubricating system, and a control system. The friction clutch is disposed in a power transfer path coupling a power source of a vehicle to drive wheels of the vehicle, and controls a torque distribution ratio between the drive wheels. The lubricating system supplies oil to the friction clutch. The control system executes clutch protection control to suppress an occurrence of a slip state of the friction clutch. The control system executes the clutch protection control when a slip amount of the friction clutch becomes larger than a first threshold while the friction clutch is in a first lubricating state, and executes the clutch protection control when the slip amount of the friction clutch becomes larger than a second threshold while the friction clutch is in a second lubricating state.

5 Claims, 14 Drawing Sheets

VEHICLE DRIVING APPARATUS

CROSS-REFERENCE TO RELATED APPLICATION

The present application claims priority from Japanese Patent Application No. 2023-033941 filed on Mar. 6, 2023, the entire contents of which are hereby incorporated by reference.

BACKGROUND

The disclosure relates to a vehicle driving apparatus.

Vehicles such as automobiles have a friction clutch that controls a torque distribution ratio between drive wheels. References are made to Japanese Unexamined Patent Application Publication Nos. 2004-245318, 2011-149515, and 2020-122561.

SUMMARY

An aspect of the disclosure provides a vehicle driving apparatus to be applied to a vehicle. The vehicle driving apparatus includes a friction clutch, a lubricating system, and a control system. The friction clutch is disposed in a power transfer path coupling a power source of the vehicle to drive wheels of the vehicle. The friction clutch is configured to control a torque distribution ratio between the drive wheels. The lubricating system includes an oil pump configured to discharge oil. The lubricating system is configured to supply the oil to the friction clutch. The control system includes a processor and a memory that are communicably coupled to each other. The control system is configured to execute clutch protection control adapted to suppress an occurrence of a slip state of the friction clutch. The friction clutch is configured to be brought into a first lubricating state or a second lubricating state in which an amount of the oil is smaller than the amount of the oil in the first lubricating state. The control system is configured to execute the clutch protection control when a slip amount of the friction clutch becomes larger than a first threshold while the friction clutch is in the first lubricating state, and execute the clutch protection control when the slip amount of the friction clutch becomes larger than a second threshold while the friction clutch is in the second lubricating state. The second threshold is smaller in the slip amount of the friction clutch than the first threshold.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
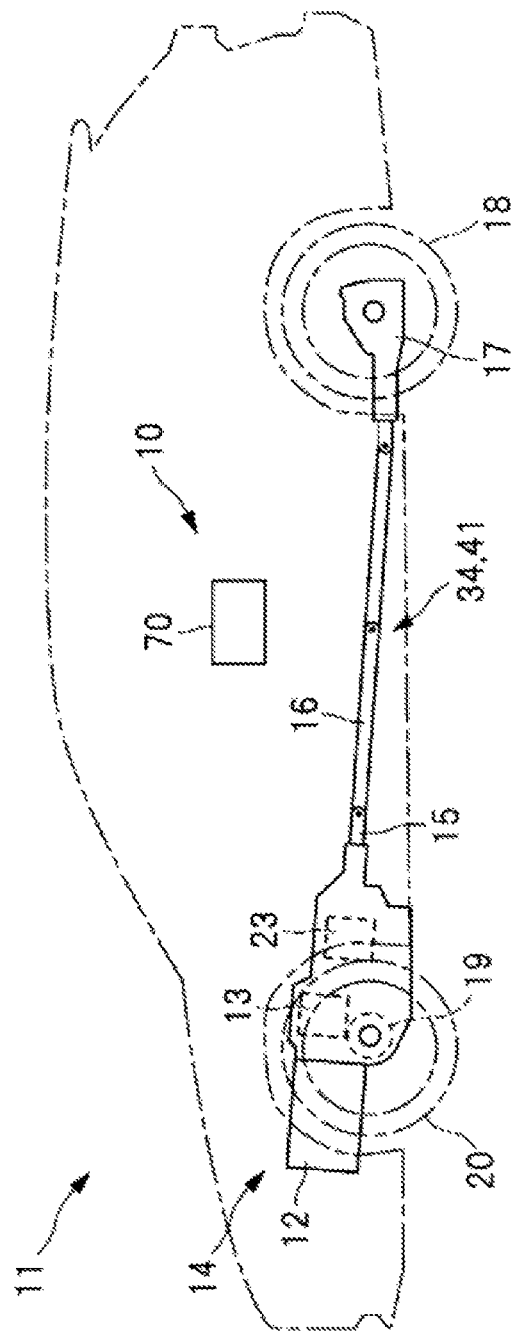
FIG. 1 is a diagram illustrating an example of a vehicle including a vehicle driving apparatus according to one example embodiment of the disclosure.

If the slip of a friction clutch is excessively increased, the friction clutch can deteriorate due to heat generation or the like.

It is desirable to appropriately protect a friction clutch.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

FIG. 1 illustrates an exemplary vehicle 11 that includes a vehicle driving apparatus 10 according to an example embodiment of the disclosure. As illustrated in FIG. 1, the vehicle driving apparatus 10 may include a power unit 14 that includes an engine 12 and a motor generator 13. A rear-wheel output shaft 15 of the power unit 14 may be coupled to a rear wheel 18 via a propeller shaft 16 and a rear differential mechanism 17. The power unit 14 may further include a front differential mechanism 19 which is coupled to a front wheel 20 via a non-illustrated driving shaft. In one embodiment, the rear wheel 18 and the front wheel 20 may each serve as a "drive wheel".

Figure 2:
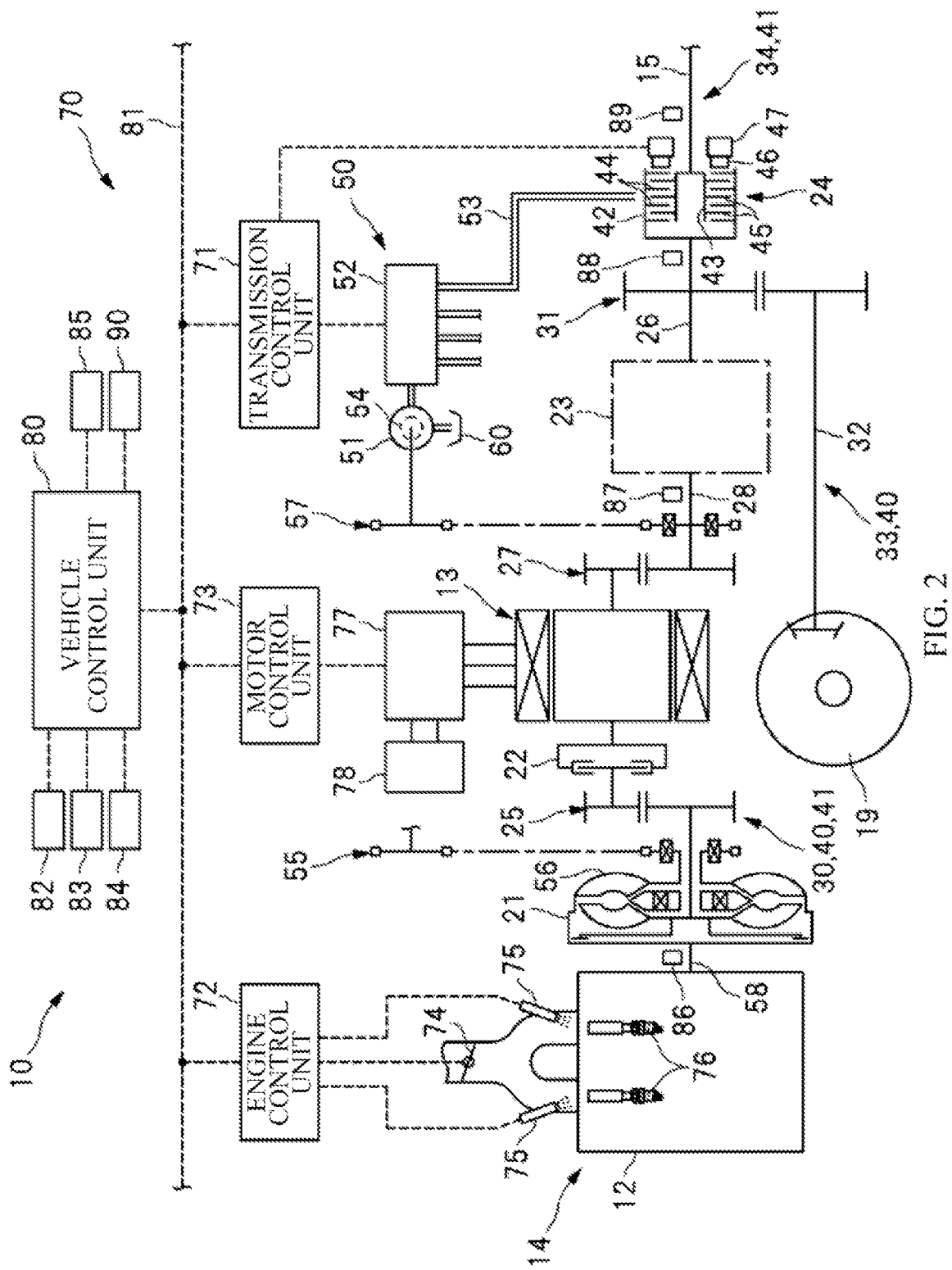
FIG. 2 is a block diagram of exemplary configurations of a power unit and a control system according to one example embodiment of the disclosure.

FIG. 2 illustrates exemplary configurations of the power unit 14 and a control system 70. As illustrated in FIG. 2, the power unit 14 may include the engine 12, a torque converter 21, an input clutch 22, a motor generator 13, a transmission mechanism 23, and a transfer clutch 24. The engine 12 and the motor generator 13 may be coupled to each other via the torque converter 21, a gear train 25, and the input clutch 22. The motor generator 13 and a transmission output shaft 26 may be coupled to each other via a gear train 27, a transmission input shaft 28, and the transmission mechanism 23. Accordingly, the engine 12 and the transmission output shaft 26 may be coupled to each other via a power source drive path 30 that includes the torque converter 21, the gear train 25, the input clutch 22, the motor generator 13, the gear train 27, the transmission input shaft 28, and the transmission mechanism 23. In one embodiment, the engine 12 and the motor generator 13 may each serve as a "power source". In one embodiment, the transfer clutch 24 may serve as a "friction clutch source".

As illustrated in FIGS. 1 and 2, the transmission output shaft 26 and the front wheel 20 may be coupled to each other via a front-wheel drive path 33 that includes a gear train 31, a front-wheel output shaft 32, and the front differential mechanism 19, for example. The transmission output shaft 26 and the rear wheel 18 may be coupled to each other via a rear-wheel drive path 34 that includes the transfer clutch 24, the rear-wheel output shaft 15, a propeller shaft 16, and the rear differential mechanism 17, for example. Accordingly, the engine 12 and the front wheel 20 may be coupled to each other via a power transfer path 40 that includes the power source drive path 30 and the front-wheel drive path 33. The engine 12 and the rear wheel 18 may be coupled to each other via a power transfer path 41 that includes the power source drive path 30 and the rear-wheel drive path 34.

As illustrated in FIG. 2, the rear-wheel drive path 34 in the power transfer path 41 may include the transfer clutch 24 that controls a torque distribution ratio between the front wheel 20 and the rear wheel 18. The transfer clutch 24 may include a clutch drum 42 coupled to the transmission output shaft 26, and a clutch hub 43 coupled to the rear-wheel output shaft 15. The transfer clutch 24 may include multiple friction plates 44 attached to the clutch drum 42, and multiple friction plates 45 attached to the clutch hub 43. The transfer clutch 24 may further include electromagnetic driving units 47 that include respective pistons 46 facing the friction plates 44 and 45.

The transfer clutch 24 may be switched to a fastening state by moving the pistons 46 of the electromagnetic driving units 47 toward forward positions to fasten the friction plates 44 to each other and fasten the friction plate 45 to each other. In contrast, the transfer clutch 24 may be switched to a release state by moving the pistons 46 of the electromagnetic driving units 47 toward rearward positions opposite to the forward positions to release fastening of the friction plates 44 and 45. The transfer clutch 24 may be brought into a slip state by adjusting the travel distance of each piston 46 between the forward position and the rearward position so that the friction plates 44 and 45 slide to come into contact with each other.

When the transfer clutch 24 is switched to the fastening state, a revolution speed of the front wheel 20 may become equal to a revolution speed of the rear wheel 18, so that the torque distribution ratio between the front wheel 20 and the rear wheel 18 becomes 50:50. When the transfer clutch 24 is switched to the release state, torque transmission to the rear wheel 18 may be interrupted, so that the torque distribution ratio between the front wheel 20 and the rear wheel 18 becomes 100:0. When the transfer clutch 24 is switched to the slip state, the torque distribution ratio between the front wheel 20 and the rear wheel 18 may be adjusted to a desired value within a predetermined range.

As illustrated in FIG. 2, the vehicle driving apparatus 10 includes an oil supply system 50 that supplies oil to the transfer clutch 24 and other components. In one embodiment, the oil supply system 50 may serve as a "lubricating system". The oil supply system 50 may include an oil pump 51 to be driven by the engine 12, for example, and a valve body 52 including multiple electromagnetic valves and oil paths, for example. The oil discharged from the oil pump 51 may be adjusted in destination, pressure, and flow rate at the valve body 52 and supplied to devices including the transmission mechanism 23 and the transfer clutch 24. The oil supplied from the valve body 52 to the devices may be used for control purpose, lubrication purpose, or cooling purpose. Further, a lubricating oil path 53 may be coupled to the valve body 52. The lubricating oil path 53 may supply lubricating oil to the transfer clutch 24. The lubricating oil path 53 that transfers the lubricating oil may be provided in the transmission output shaft 26 or the rear-wheel output shaft 15, for example.

A rotor 54 of the oil pump 51 may be coupled to a pump shell 56 of the torque converter 21 via a chain mechanism 55 including a one-way clutch. Further, the rotor 54 of the oil pump 51 may be coupled to the transmission input shaft 28 via a chain mechanism 57 including a one-way clutch. Accordingly, the rotor 54 of the oil pump 51 may be coupled to a crank shaft 58 of the engine 12 and coupled to the transmission input shaft 28 of the power transfer paths 40 and 41. In one embodiment, the transmission input shaft 28 may serve as a "rotary shaft". While the engine 12 is in a driving state, a driving force may be transmitted from the crank shaft 58 to the oil pump 51 via the chain mechanism 55. In contrast, while the engine 12 is in a stop state and the vehicle 11 is traveling in a motor traveling mode in which the transmission input shaft 28 rotates, the driving force may be transmitted from the transmission input shaft 28 to the oil pump 51 via the chain mechanism 57. Note that, in the motor traveling mode in which the vehicle 11 travels while the engine 12 is being stopped, the input clutch 22 disposed between the engine 12 and the motor generator 13 may be released to separate the engine 12 from the power unit 14.

Figure 3:
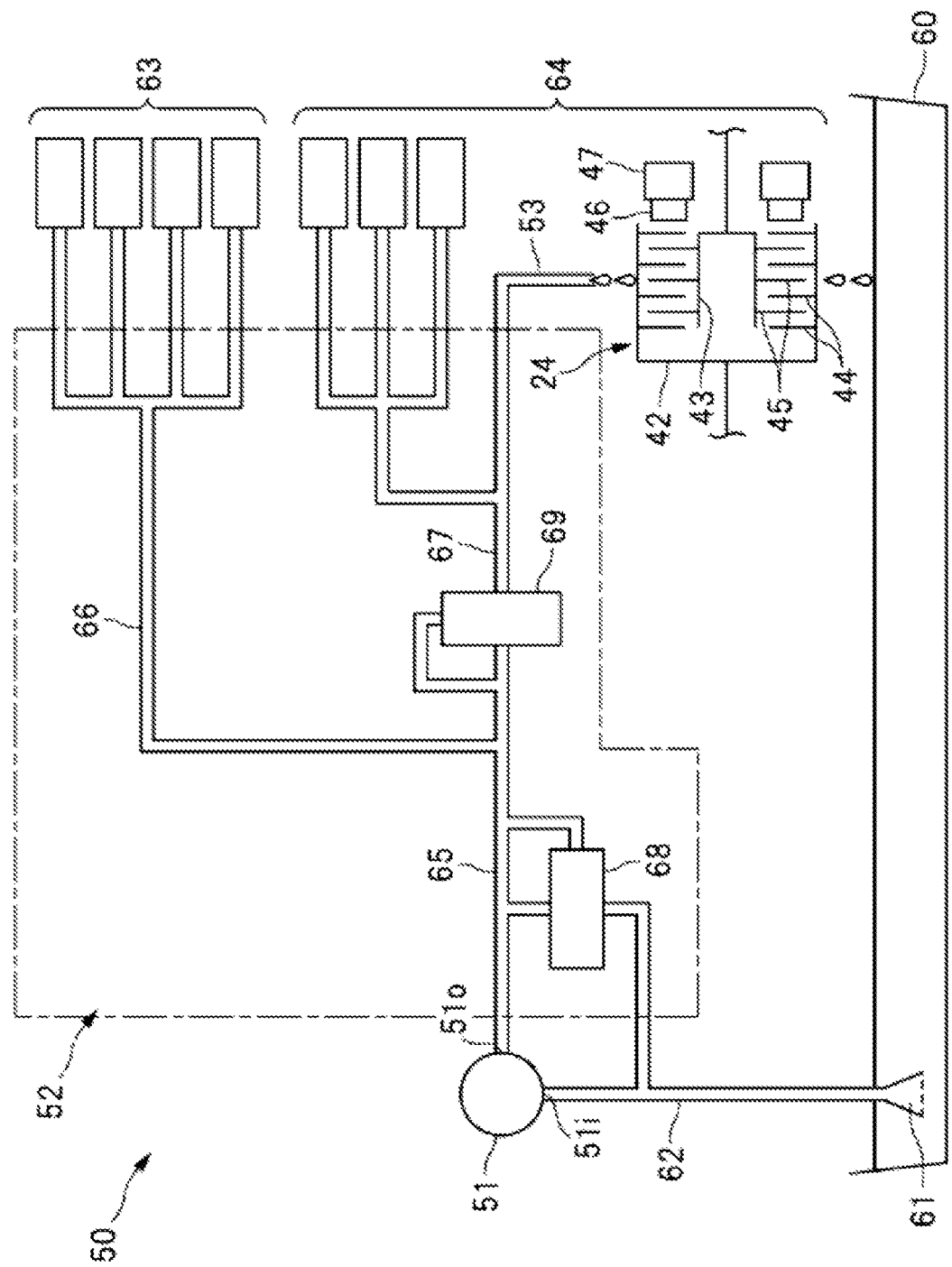
FIG. 3 is a block diagram of a part of an oil supply system according to one example embodiment of the disclosure.

FIG. 3 illustrates a part of the oil supply system 50. Note that illustration of an electromagnetic value that controls the pressure and destination of the oil is omitted in FIG. 3. As illustrated in FIG. 3, a strainer 61 disposed in an oil pan 60 may be coupled to an inlet port 51*i* of the oil pump 51 via a suction oil path 62. In addition, a first device group 63 and a second device group 64 may be coupled to an outlet port 51*o* of the oil pump 51 via the valve body 52. When the oil pump 51 is driven, the oil may be supplied from the oil pan 60 to the valve body 52 and then to the first device group 63 and the second device group 64 via the valve body 52. The first device group 63 may include various devices, including the transmission mechanism 23, that consume a large amount of oil. The second device group 64 may include various devices, including the transfer clutch 24, that consume a small amount of oil. As to be described later, the oil may be supplied to the first device group 63 preferentially over the second device group 64 when a lubricating valve 69 disposed in the valve body 52 is operated.

The valve body 52 may have a line pressure path 65, a first oil supply path 66, and a second oil supply path 67. The line pressure path 65 may be coupled to the outlet port 51*o* of the oil pump 51. The first oil supply path 66 may be coupled to the line pressure path 65 and supply the oil to the first device group 63. The second oil supply path 67 may be coupled to the line pressure path 65 and supply the oil to the second device group 64. The valve body 52 may include a relief valve 68 and a lubricating valve 69. The relief valve 68 may be coupled to the line pressure path 65 and adjust the pressure of the oil to be supplied to the line pressure path 65. The lubricating valve 69 may be provided in the second oil supply path 67 and configured to block the second oil supply path 67. When the hydraulic pressure inside the line pressure path 65 becomes lower than a predetermined hydraulic pressure, the lubricating valve 69 of the valve body 52 may be switched to a close state to block the second oil supply path 67. In contrast, when the hydraulic pressure inside the line pressure path 65 becomes the predetermined hydraulic pressure or higher, the lubricating valve 69 may be switched to an open state to communicate with the second oil supply path 67.

When the amount of discharged oil is small due to a low rotation speed of the oil pump 51, the lubricating valve 69 may be switched to the close state in association with a decrease in the hydraulic pressure inside the line pressure path 65, so that an oil supply to the second device group 64 including the transfer clutch 24 is stopped. In this way, when the lubricating valve 69 is closed due to the decrease in hydraulic pressure inside the line pressure path 65, the oil supply to the second device group 64 may be stopped, whereas oil supply to the first device group 63 may be executed. In contrast, when the amount of discharged oil is large due to a high rotation speed of the oil pump 51, the lubricating valve 69 may be switched to the open state in association with the increase in hydraulic pressure inside the line pressure path 65, so that the oil supply to both of the first device group 63 and the second device group 64 may be executed.

As described above, when the lubricating valve 69 is switched to the close state in association with the decrease in rotation speed of the oil pump 51, the supply of lubricating oil to the transfer clutch 24 in the second device group 64 may be stopped. For example, the lubricating valve 69 may be switched to the close state in a case where the vehicle 11 starts traveling in the motor traveling mode in which the engine 12 is stopped and where the vehicle speed and the rotation speed of the transmission input shaft 28 are low. In other words, the oil supply system 50 may stop supplying the lubricating oil to the transfer clutch 24 when the traveling speed of the vehicle 11 becomes lower than a predetermined speed threshold while the engine 12 is being stopped.

If the oil supply to the transfer clutch 24 is stopped at the start of the motor traveling mode, the transfer clutch 24 may be brought into a second lubricating state in which the amount of lubricating oil is insufficient depending on a leakage time Tb1, as to be described later. The leakage time Tb1 may be a soak time corresponding to an efflux time of the lubricating oil. The transfer clutch 24 may have a structure that gradually drops the lubricating oil from the clutch drum 42 to the oil pan 60. The soak time may be a time from a timing at which a driver who drives the vehicle 11 turns off a start-up switch 90 to a timing at which the driver turns on the start-up switch 90, as to be described later. In one embodiment, the driver who drives the vehicle 11 may serve as an "occupant" of the vehicle 11.

As described above, when lubricating valve 69 is switched to the open state in association with the increase in rotation speed of the oil pump 51, the lubricating oil may be supplied to the transfer clutch 24 in the second device group 64. In this way, the lubricating valve 69 may be switched to the open state in a case where the oil pump 51 is driven by the engine 12 in a driven state or where the vehicle travels at a high speed in the motor traveling mode. When the lubricating valve 69 is switched to the open state and the lubricating oil is thereby supplied to the transfer clutch 24, the transfer clutch 24 may be brought into a first lubricating state in which the amount of lubricating oil is appropriate, as to be described later. That is, the second lubricating state in which the amount of lubricating oil in the transfer clutch 24 is insufficient descried above may refer to the state in which the amount of lubricating oil is smaller than the appropriate amount of the lubricating oil in the first lubricating state.

As illustrated in FIG. 2, the vehicle driving apparatus 10 may include the control system 70 that includes a plurality of electronic control units. Examples of the electronic control units of the control system 70 may include a transmission control unit 71, an engine control unit 72, and a motor control unit 73. The transmission control unit 71 may be an electronic control unit that outputs a control signal to the valve body 52 and the electromagnetic driving unit 47, for example. The engine control unit 72 may be an electronic control unit that outputs a control signal to the throttle valve 74, an injector 75, and an ignition device 76, for example. The motor control unit 73 may be an electronic control unit that outputs a control signal to an inverter 77 coupled to the motor generator 13, for example. The inverter 77 may be a power converter to which a battery pack 78 is coupled.

The electronic control units of the control system 70 may further include a vehicle control unit 80 that outputs a control signal to the transmission control unit 71, the engine control unit 72, and the motor control unit 73. The transmission control unit 71, the engine control unit 72, the motor control unit 73, and the vehicle control unit 80 may be communicably coupled to each other via an in-vehicle network 81 such as a controller area network (CAN). The vehicle control unit 80 may set an operation target value of the power unit 14 based on input data received from the electronic control units and various sensors to be described later, for example. The vehicle control unit 80 may further generate a control signal corresponding to the operation target value of the power unit 14 and output the control signal to the engine control unit 72, the motor control unit 73, and the transmission control unit 71, for example.

Examples of the sensors coupled to the vehicle control unit 80 may include an accelerator sensor 82 that detects an operation amount of an accelerator pedal, a brake sensor 83 that detects an operation amount of a brake pedal, a vehicle speed sensor 84 that detects a traveling speed of the vehicle 11 (hereinafter also referred to as a vehicle speed), a temperature sensor 85 that detects a temperature of the oil, a rotation sensor 86 that detects a rotation speed of the crank shaft 58, a rotation sensor 87 that detects the transmission input shaft 28, a rotation sensor 88 that detects a rotation speed of the transmission output shaft 26, and a rotation sensor 89 that detects a rotation speed of the rear-wheel output shaft 15.

The start-up switch 90 to be operated to start or stop the control system 70 may be coupled to the vehicle control unit 80. Each time when the driver pushes the start-up switch 90, a power mode of the control system 70 may be switched between an ON mode and an OFF mode. For example, when the start-up switch 90 is pushed while the power mode is the OFF mode, that is, when the start-up switch 90 is turned on by the driver, the control system 70 may switch the power mode from the OFF mode to the ON mode. When the start-up switch 90 is pushed while the power mode is the ON mode, that is, when the start-up switch 90 is turned off by the driver, the power mode of the control system 70 may be switched from the ON mode to the OFF mode. Note that the ON mode may be a power mode in which the control system 70 is started and the vehicle 11 is able to travel, and the OFF mode may be a power mode in which the control system 70 is stopped and the vehicle 11 is unable to travel. The start-up switch 90 may be also referred to as an ignition switch.

Figure 4:
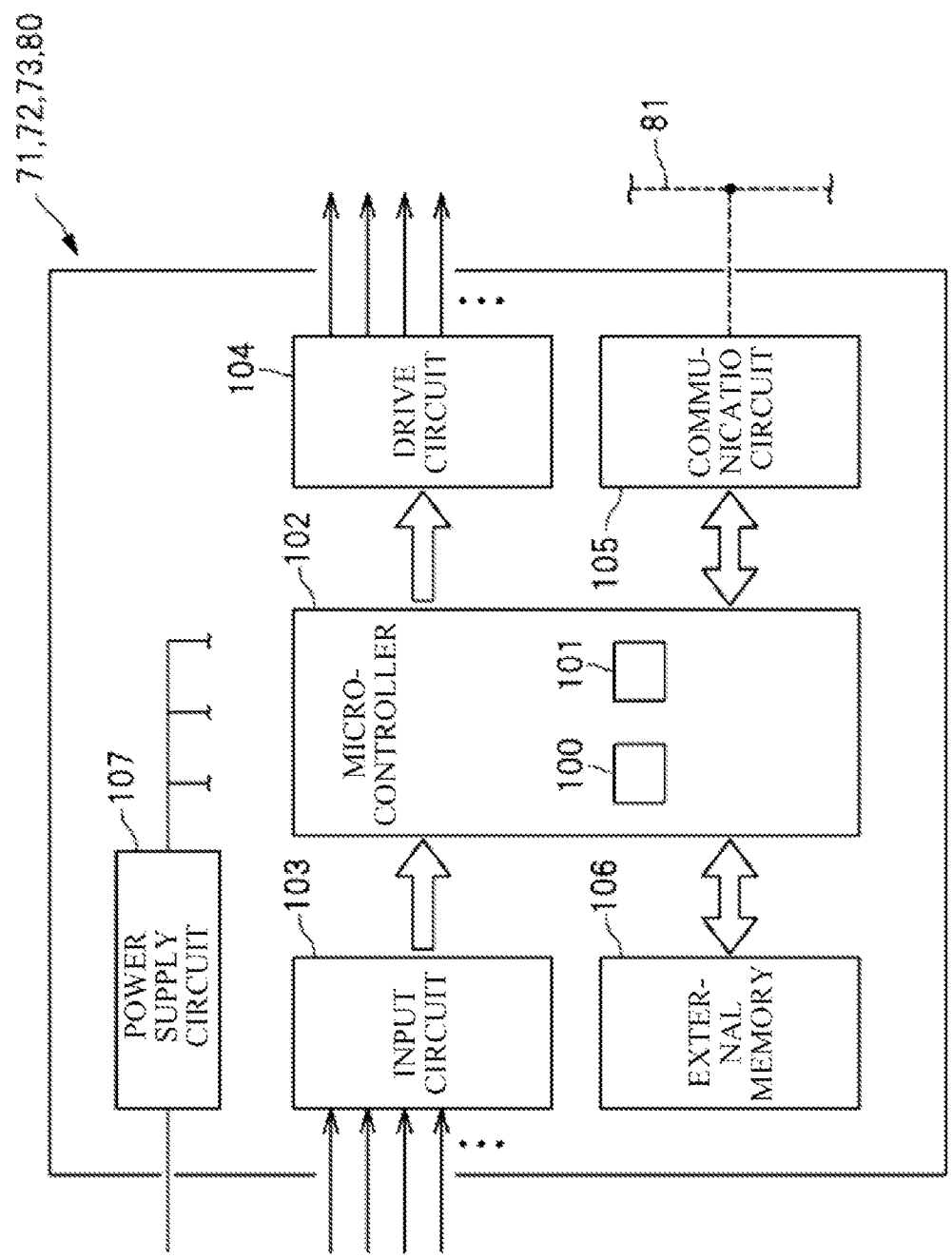
FIG. 4 is a block diagram illustrating an exemplary schematic configuration of a control unit according to one example embodiment of the disclosure.

FIG. 4 illustrates an exemplary configuration of each of the transmission control unit 71, the engine control unit 72, the motor control unit 73, and the vehicle control unit 80. As illustrated in FIG. 4, the transmission control unit 71, the engine control unit 72, the motor control unit 73, and the vehicle control unit 80 that are electronic control units may each include a microcontroller 102 that includes a processor 100 and a main memory 101, for example. The main memory 101 may store a predetermined program to be executed by the processor 100. The processor 100 and the main memory 101 may be communicably coupled to each other. Note that the microcontroller 102 may include a plurality of processors 100 or a plurality of main memories 101. In one embodiment, the main memory 101 may serve as a "memory".

Each of the transmission control unit 71, the engine control unit 72, the motor control unit 73, and the vehicle control unit 80 may further include an input circuit 103, a drive circuit 104, a communication circuit 105, an external memory 106, and a power supply circuit 107. The input circuit 103 may convert signals received from the various sensors into signals receivable by the microcontroller 102. Based on the signal received from the microcontroller 102, the drive circuit 104 may generate a drive signal to be sent to the above-described devices including the valve body 52 and the electromagnetic driving unit 47. The communication circuit 105 may convert the signal received from the microcontroller 102 into a communication signal to be sent to another control unit. In addition, the communication circuit 105 may convert communication signals received from the other electronic control units into signals receivable by the microcontroller 102. The power supply circuit 107 may supply a stable power voltage to the microcontroller 102, the input circuit 103, the drive circuit 104, the communication circuit 105, and the external memory 106, for example. The external memory 106 may be a non-volatile memory in which programs and various kinds of data are stored, for example.

To protect the transfer clutch 24 from overheat generation or the like, the control system 70 may perform clutch protection control to suppress the occurrence of the slip state of the transfer clutch 24. As described above, the transfer clutch 24 may be brought into the first lubricating state in which the amount of lubricating oil is appropriate, and the second lubricating state in which the amount of lubricating oil is insufficient and smaller than that in the first lubricating state. It has been therefore desired to appropriately execute the clutch protection control depending on the lubricating state of the transfer clutch 24. For example, when the amount of lubricating oil is insufficient at the start of the motor traveling mode, the clutch protection control is to be appropriately executed depending on the lubricating state of the transfer clutch 24.

In the following, a clutch lubrication determination, a leakage time determination, and a clutch load determination are described, following which the clutch protection control is described. Steps of the clutch lubrication determination, steps of the leakage time determination, steps of the clutch load determination, and steps of the clutch protection control may be performed by the processor 100 in the control system 70. In addition, the clutch lubrication determination, the leakage time determination, the clutch load determination, and the clutch protection control may be performed in a predetermined cycle.

Figure 5:
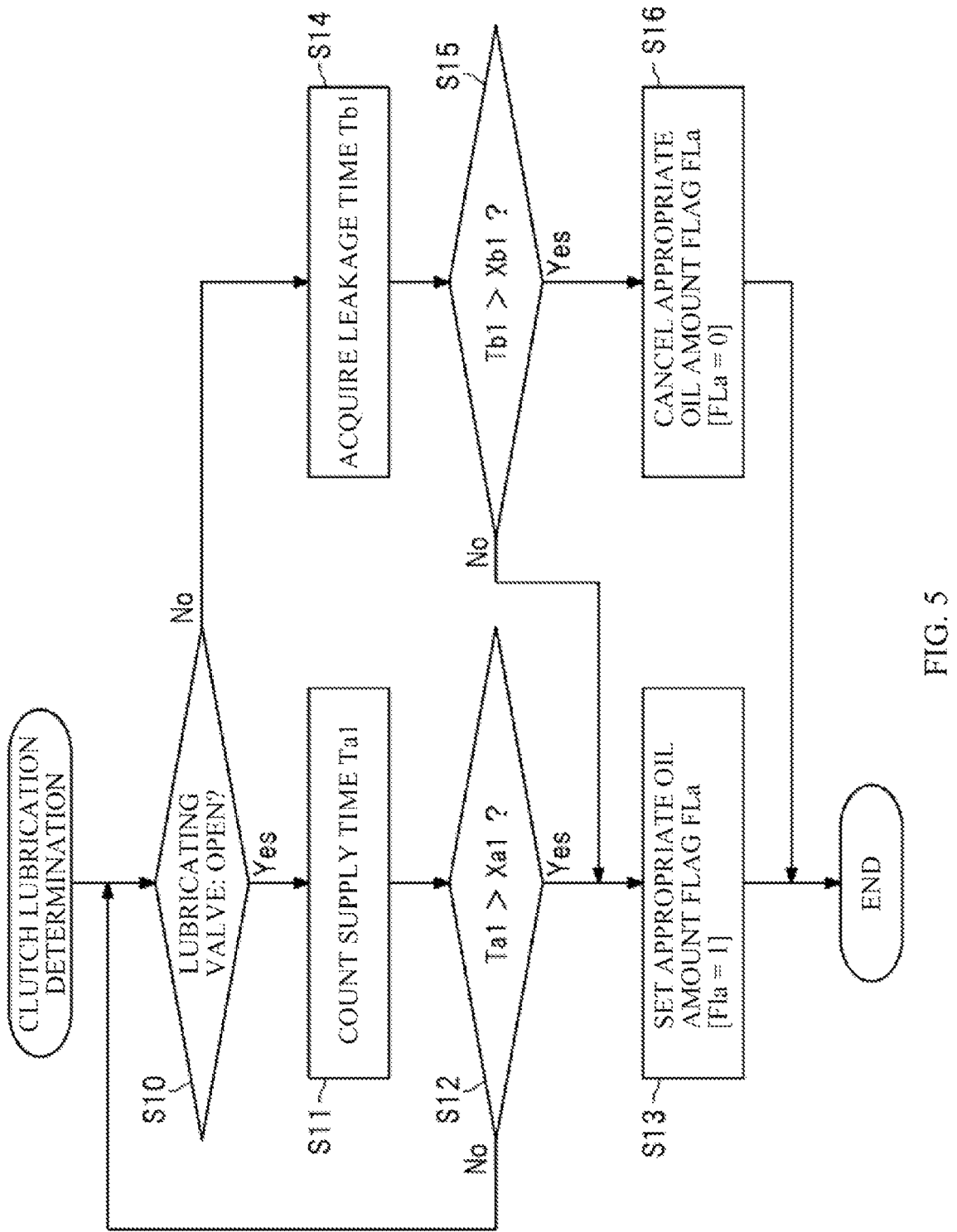
FIG. 5 is a flowchart of an exemplary procedure for a clutch lubrication determination according to one example embodiment of the disclosure.
Figure 6:
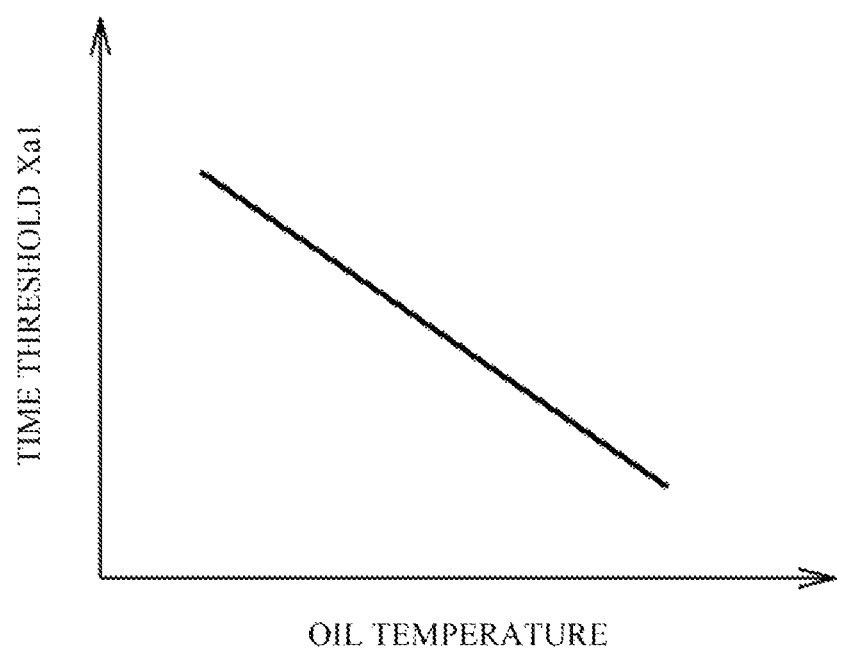
FIG. 6 is a diagram illustrating an exemplary relation between a time threshold and an oil temperature according to one example embodiment of the disclosure.

FIG. 5 is a flowchart of an exemplary procedure for the clutch lubrication determination. FIG. 6 illustrates an exemplary relation between a time threshold Xal and an oil temperature. As illustrated in FIG. 5, the control system 70 may determine whether the lubricating valve 69 is in the open state in Step S10. As described above, the lubricating valve 69 may be switched to the open state when the oil pump 51 is driven and the hydraulic pressure inside the line pressure path 65 becomes higher than the predetermined hydraulic pressure. Accordingly, the control system 70 may determine that the lubricating valve 69 is in the open state when the rotation speed of the crank shaft 58 is higher than a predetermined rotation speed or when the rotation speed of the transmission input shaft 28 is higher than a predetermined rotation speed. Alternatively, the control system 70 may determine that the lubricating valve 69 is in the open state when the vehicle speed is higher than a predetermined speed, for example. Still alternatively, the control system 70 may determine that the lubricating valve 69 is in the open state when the hydraulic pressure inside the line pressure path 65 is higher than the predetermined hydraulic pressure.

When the control system 70 determines that the lubricating valve 69 is in the open state (Step S10: Yes), the procedure may proceed to Step S11. In Step S11, the control system 70 may count a supply time Tal which is an elapsed time from the opening of the lubricating valve 69. Thereafter, in Step S12, the control system 70 may determine whether the supply time Tal is longer than a predetermined time threshold Xal. As illustrated in FIG. 6, the time threshold Xal may decrease as the oil temperature increases. That is, the time threshold Xal may be set to a smaller value as the oil temperature increases because the viscosity of the oil is low and easy to flow when the oil temperature is high.

As illustrated in FIG. 5, when the control system 70 determines that the supply time Tal is longer than the time threshold Xal (Step S12: Yes), it may be determined that the transfer clutch 24 has been supplied with a sufficient amount of the lubricating oil. The procedure may thus proceed to Step S13 in which the control system 70 sets an appropriate oil amount flag FLa (FLa=1). The appropriate oil amount flag Fla may be set when the transfer clutch 24 is in the first lubricating state in which the amount of lubricating oil is appropriate. When the control system 70 determines that the supply time Tal is shorter than or equal to the time threshold Xal (Step S12: No), sufficient time has not elapsed since the opening of the lubricating valve 69. The procedure may thus return to Step S10 in which the control system 70 determines whether the lubricating valve 69 is in the open state again.

In contrast, when the control system 70 determines that the lubricating valve 69 is in the close state (Step S10: No), the procedure may proceed to Step S14 in which the control system 70 acquires the leakage time Tb1, which is the efflux time of the lubricating oil. The leakage time Tb1 will be described in detail later in the description of a leakage time determination. After the control system 70 acquires the leakage time Tb1 in Step S14, the procedure may proceed to Step S15 in which the control system 70 determines whether the leakage time Tb1 is longer than a predetermined time threshold Xb1. When the control system 70 determines that the leakage time Tb1 is longer than the time threshold Xb1 (Step S15: Yes), it may be determined that a large amount of the lubricating oil has flown from the transfer clutch 24. The procedure may thus proceed to Step S16 in which the control system 70 cancels the setting of the appropriate oil amount flag FLa (FLa=0). The appropriate oil amount flag FLa may be cancelled when the transfer clutch 24 is in the second lubricating state in which the amount of lubricating oil is insufficient. In contrast, when the control system 70 determines that the leakage time Tb1 is shorter than or equal to the time threshold Xb1 (Step $15: No), it may be determined that a sufficient amount of the lubricating oil is held in the transfer clutch 24. The procedure may thus proceed to Step S13 in which the control system 70 sets the appropriate oil amount flag FLa (FLa=1).

Figure 7:
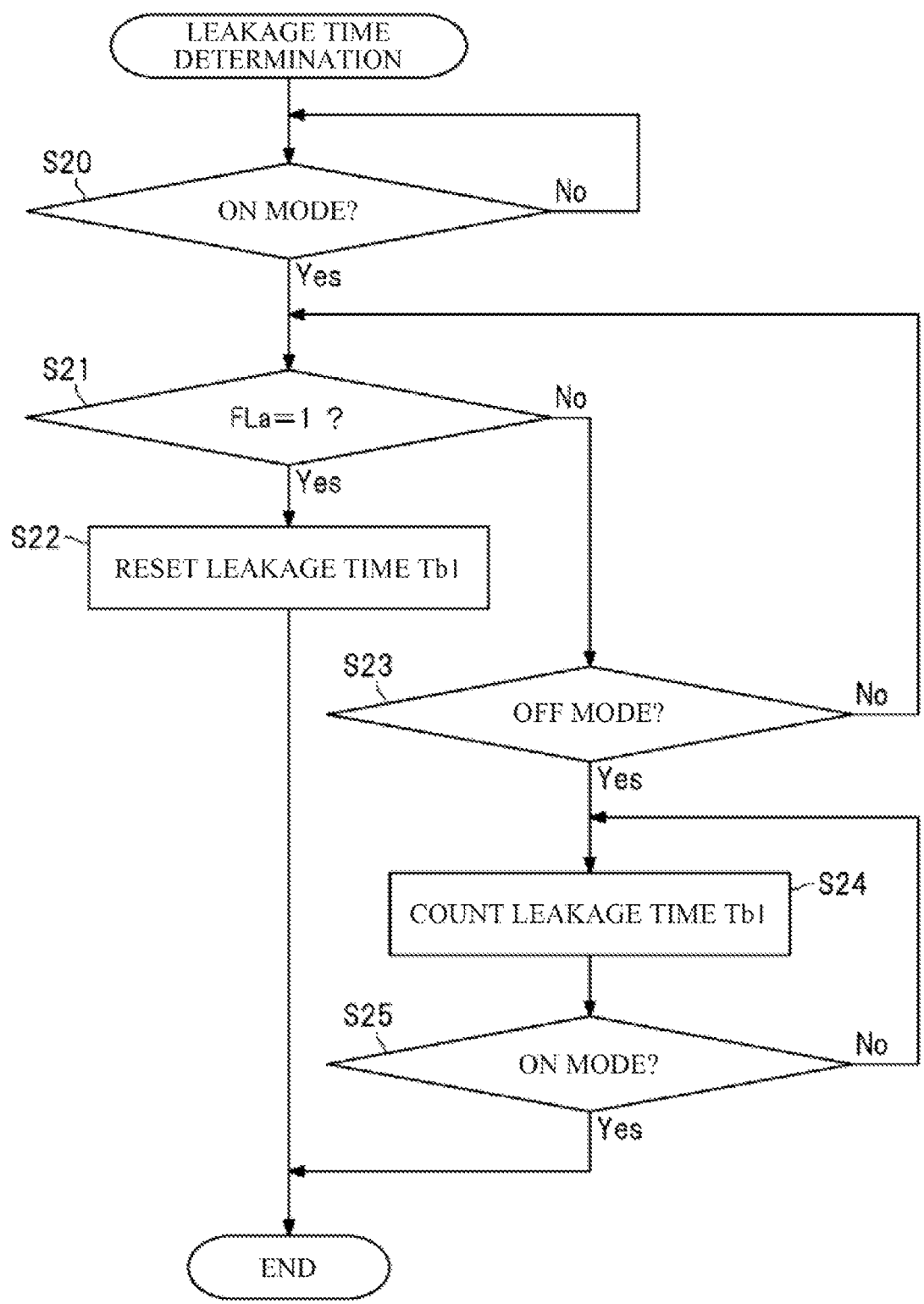
FIG. 7 is a flowchart of an exemplary procedure for a leakage time determination according to one example embodiment of the disclosure.
Figure 8:
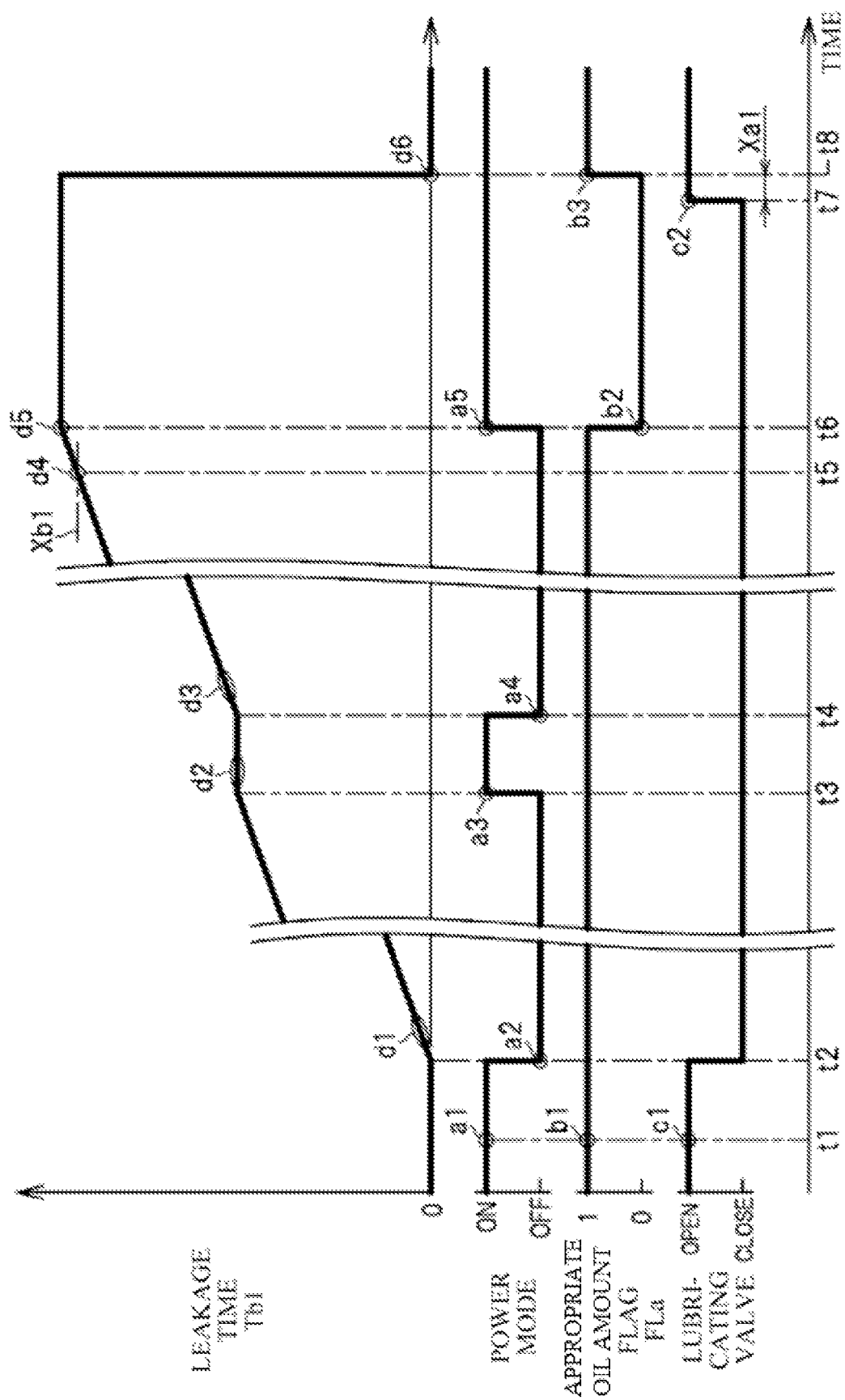
FIG. 8 is a timing chart illustrating an exemplary transition of a leakage time according to one example embodiment of the disclosure.

FIG. 7 is a flowchart of an exemplary procedure for the leakage time determination. FIG. 8 is a timing chart illustrating an exemplary transition of the leakage time Tb1. As illustrated in FIG. 7, the control system 70 may determine whether the power mode is the ON mode in Step S20. When the control system 70 determines that the power mode is the ON mode (Step S20: Yes), that is, when the control system 70 determines that the vehicle 11 is able to travel, the procedure may proceed to Step S21 in which the control system 70 determines whether the appropriate oil amount flag FLa has been set. When the control system 70 determines that the appropriate oil amount flag FLa has been set (Step S21: Yes), the procedure may proceed to Step S22 in which the control system 70 resets the leakage time Tb1 (Tb1=0).

In contrast, when the control system 70 determines that the appropriate oil amount flag FLa has not been set (Step S21: No), the procedure may proceed to Step S23 in which the control system 70 determines whether the power mode is the OFF mode. When the control system 70 determines that the power mode is the OFF mode (Step S23: Yes), that is, when the control system 70 determines that the vehicle 11 is unable to travel, the procedure may proceed to Step S24 in which the control system 70 counts the leakage time Tb1. After the control system 70 counts the leakage time Tb1 in Step S24, the procedure may proceed to Step S25 in which the control system 70 determines whether the power mode is the ON mode. When the control system 70 determines that the power mode is the OFF mode (Step S25: No), that is, when the power mode is maintained in the OFF mode, the procedure may return to Step S24 in which the control system 70 counts the leakage time Tb1. In contrast, when the control system 70 determines that the power mode is the ON mode (Step S25: Yes), that is, when the power mode has been switched from the OFF mode to the ON mode, the procedure may exit the routine.

That is, the control system 70 may count the leakage time Tb1, which is the efflux time of the lubricating oil, when the power mode is the OFF mode in which the oil pump 51 is not driven. The leakage time Tb1 may be a supply stop time during which the supply of the lubricating oil to the transfer clutch 24 is stopped. In other words, the leakage time Tb1 is a soak time from a timing at which the start-up switch 90 is turned off by the driver to a timing at which the start-up switch 90 is turned on by the driver. Note that some of the operations of the control system 70 may be enabled even when the power mode is the OFF mode. For example, the control system 70 is able to count the leakage time Tb1 even when the power mode is the OFF mode.

As illustrated in FIG. 8, at a time t1, the power mode may be the ON mode (as indicated by a reference numeral a1), the appropriate oil amount flag FLa may be set (as indicated by a reference numeral b1), and the lubricating valve 69 may be in the open state (as indicated by a reference numeral c1). At a time t2, the power mode may be switched from the ON mode to the OFF mode (as indicated by a reference numeral a2), and the control system 70 may start counting the leakage time Tb1 (as indicated by a reference numeral d1). At a time t3, the power mode may be switched from the OFF mode to the ON mode (as indicated by a reference numeral a3), and the control system 70 may stop counting the leakage time Tb1 (as indicated by a reference numeral d2). Thereafter, at a time t4, the power mode may be switched from the ON mode to the OFF mode again (as indicated by a reference numeral a4), and the control system 70 may start counting the leakage time Tb1 again (as indicated by a reference numeral d3). Thereafter, at a time t5, the leakage time Tb1, which increases while the OFF mode is maintained, may become longer than the predetermined time threshold Xb1 (as indicated by a reference numeral d4).

Thereafter, at a time t6, the power mode may be switched from the OFF mode to the ON mode (as indicated by a reference numeral a5), and the leakage time Tb1 may become longer than the time threshold Xb1 (as indicated by a reference numeral d5). Therefore, the control system 70 may determine that the transfer clutch 24 is in the second lubricating state in which the amount of the lubricating oil is insufficient and cancel the setting of the appropriate oil amount flag FLa (as indicated by a reference numeral b2). Thereafter, at a time t7, the lubricating valve 69 may be switched to the open state in association with the start-up of the engine or an increase in vehicle speed (as indicated by a reference numeral c2). When an elapsed time from the time t7 is longer than the time threshold Xal, the control system 70 may determine that the transfer clutch 24 is in the first lubricating state in which the amount of lubricating oil is appropriate and set the appropriate oil amount flag FLa (as indicated by a reference numeral b3) at a time t8. When the appropriate oil amount flag FLa is set at the time t8 (as indicated by a reference numeral b3), the control system 70 may reset the leakage time Tb1 (as indicated by a reference numeral d6).

As described above, when the leakage time Tb1, which corresponds to a duration time of the OFF mode, is longer than the predetermined time threshold Xb1 (as indicated by the reference numeral d5), the control system 70 may determine that the transfer clutch 24 is in the second lubricating mode in which the amount of lubricating oil is insufficient (as indicated by the reference numeral b2). Thereafter, when the predetermined time has elapsed since the switch of the lubricating valve 69 to the open state, the control system 70 may determine that the transfer clutch 24 is in the first lubricating state in which the amount of lubricating oil is appropriate (as indicated by the reference numeral b3). Accordingly, the control system 70 makes it possible to appropriately determine the second lubricating state of the transfer clutch 24 in which the amount of lubricating oil is insufficient based on the leakage time Tb1 in which the lubricating oil is flown from the transfer clutch 24. Because the control system 70 refrains from resetting the leakage time Tb1 until the transfer clutch 24 is determined to be in the first lubricating state in which the amount of lubricating oil is appropriate, it is possible to appropriately determine the second lubricating state of the transfer clutch 24 in which the amount of lubricating oil is insufficient.

Figure 9:
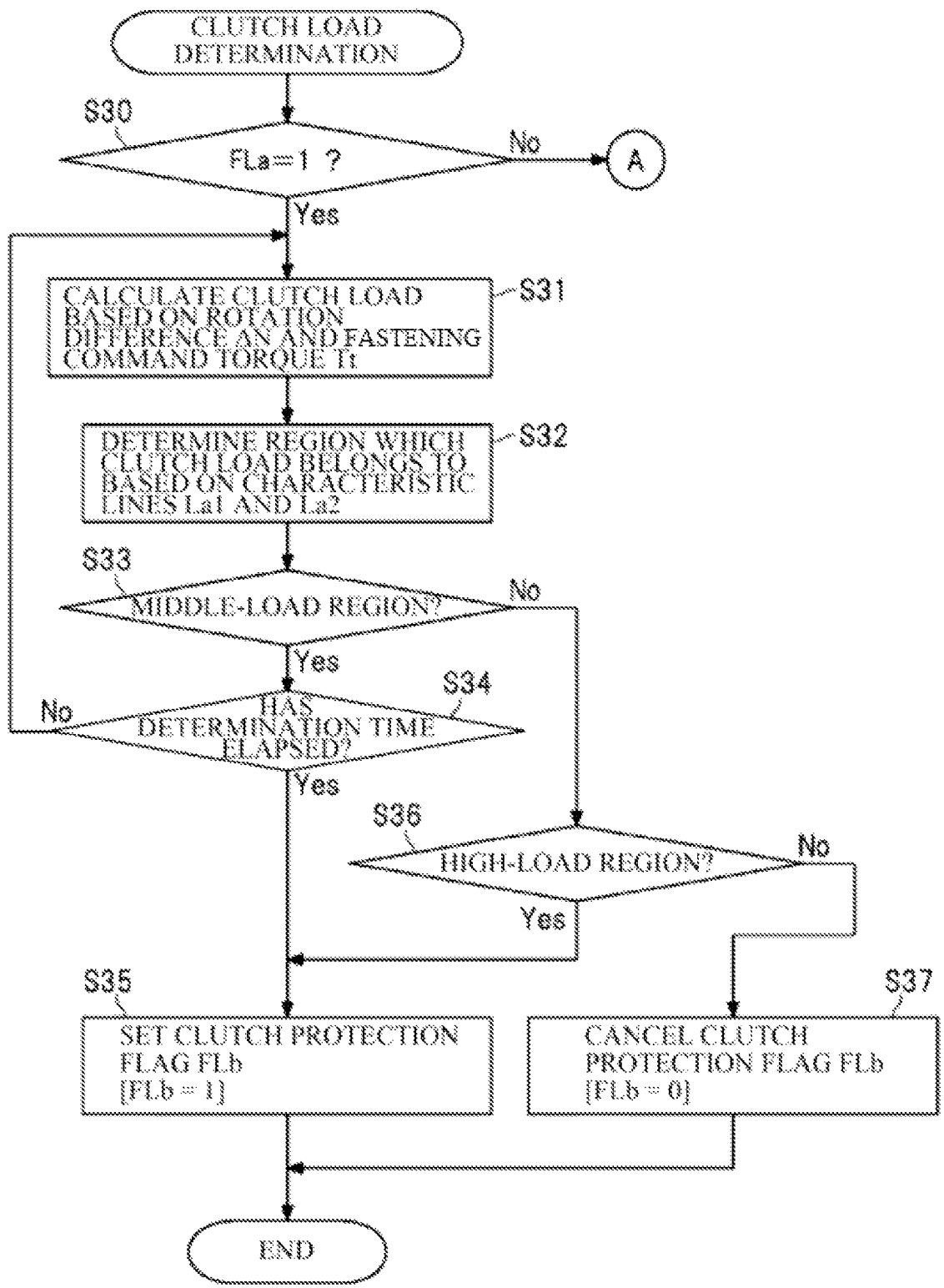
FIG. 9 is a flowchart of an exemplary procedure for a clutch load determination according to one example embodiment of the disclosure.
Figure 10:
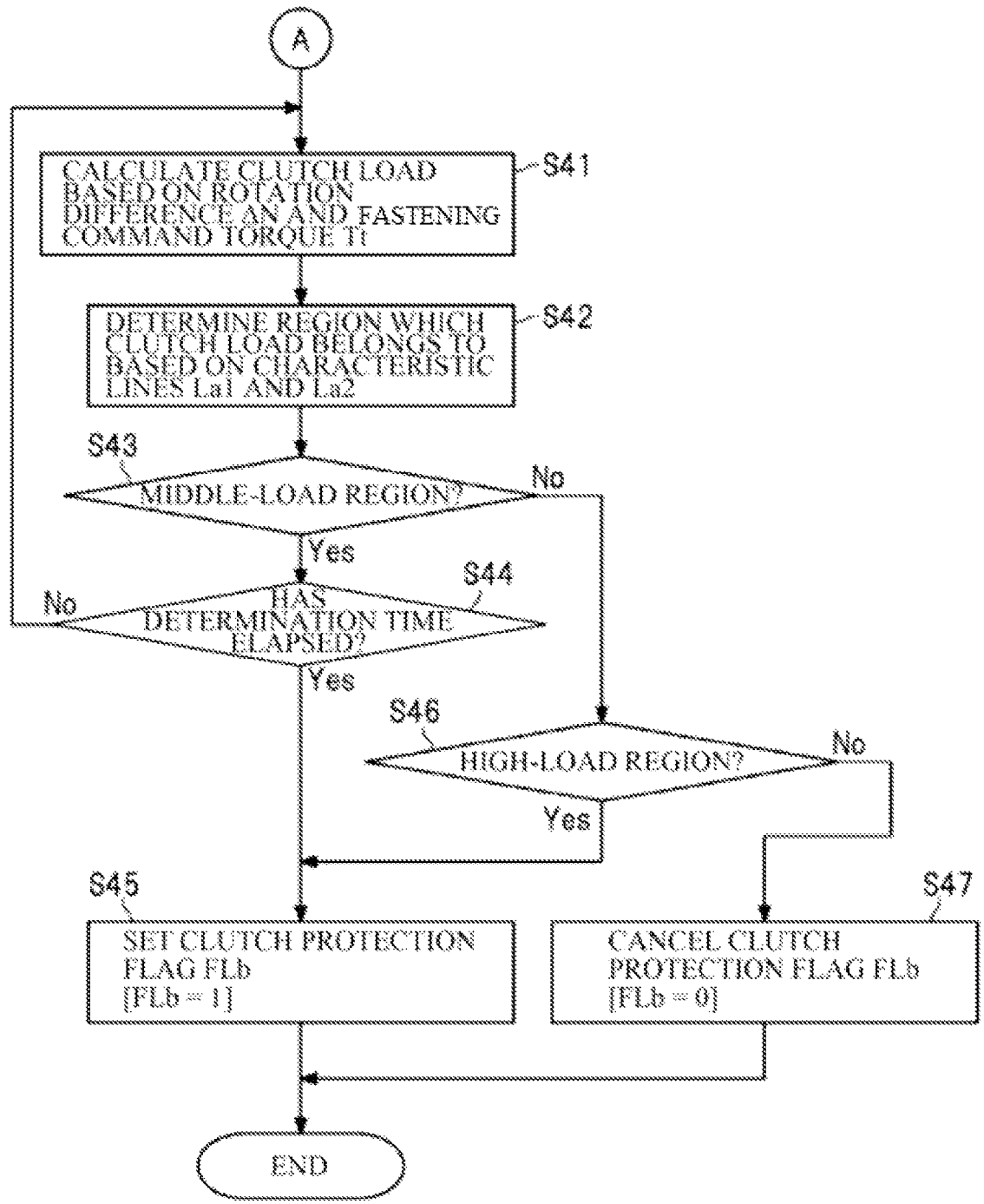
FIG. 10 is a flowchart of an exemplary procedure for the clutch load determination according to one example embodiment of the disclosure.
Figure 11:
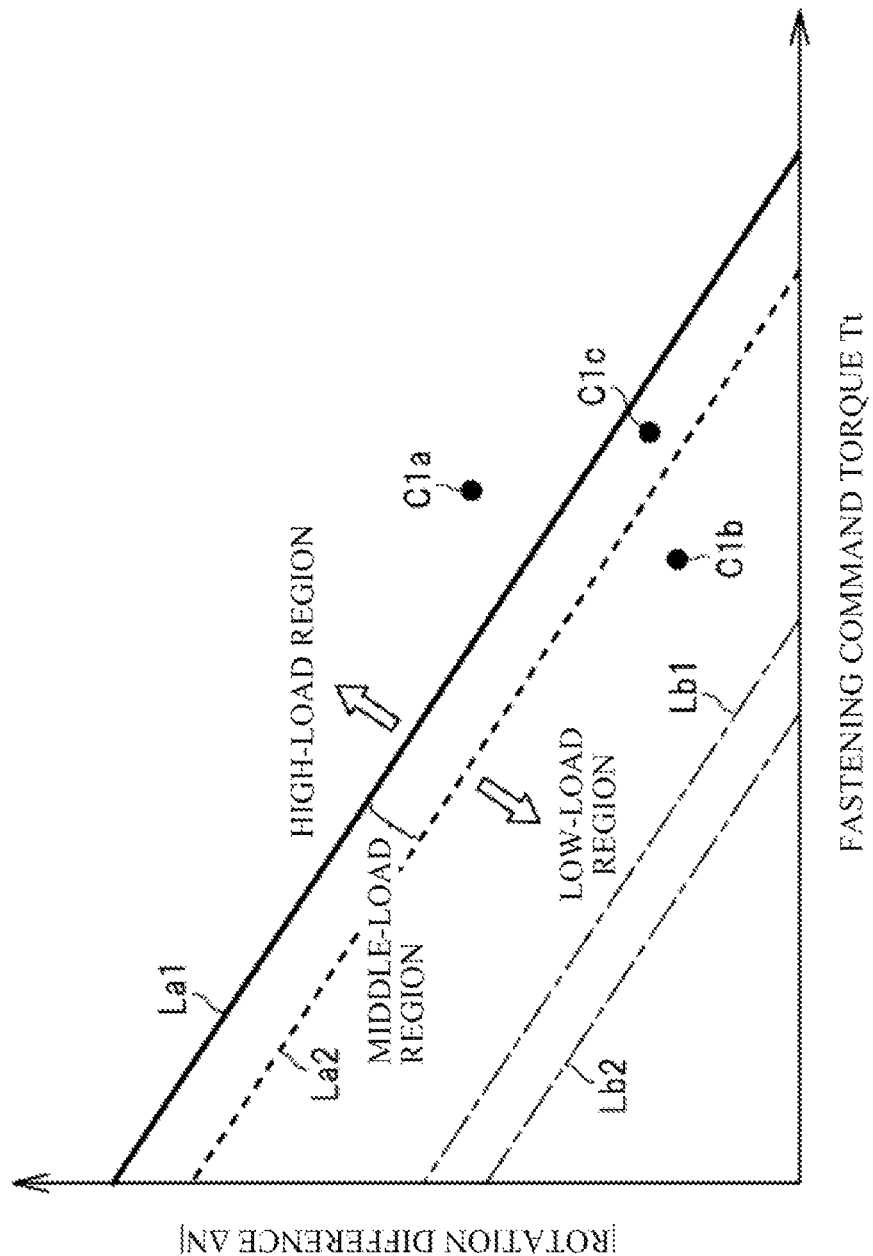
FIG. 11 is a diagram illustrating exemplary characteristic line to be used in a first lubricating state of a transfer clutch in which the amount of lubricating oil is appropriate, according to one example embodiment of the disclosure.
Figure 12:
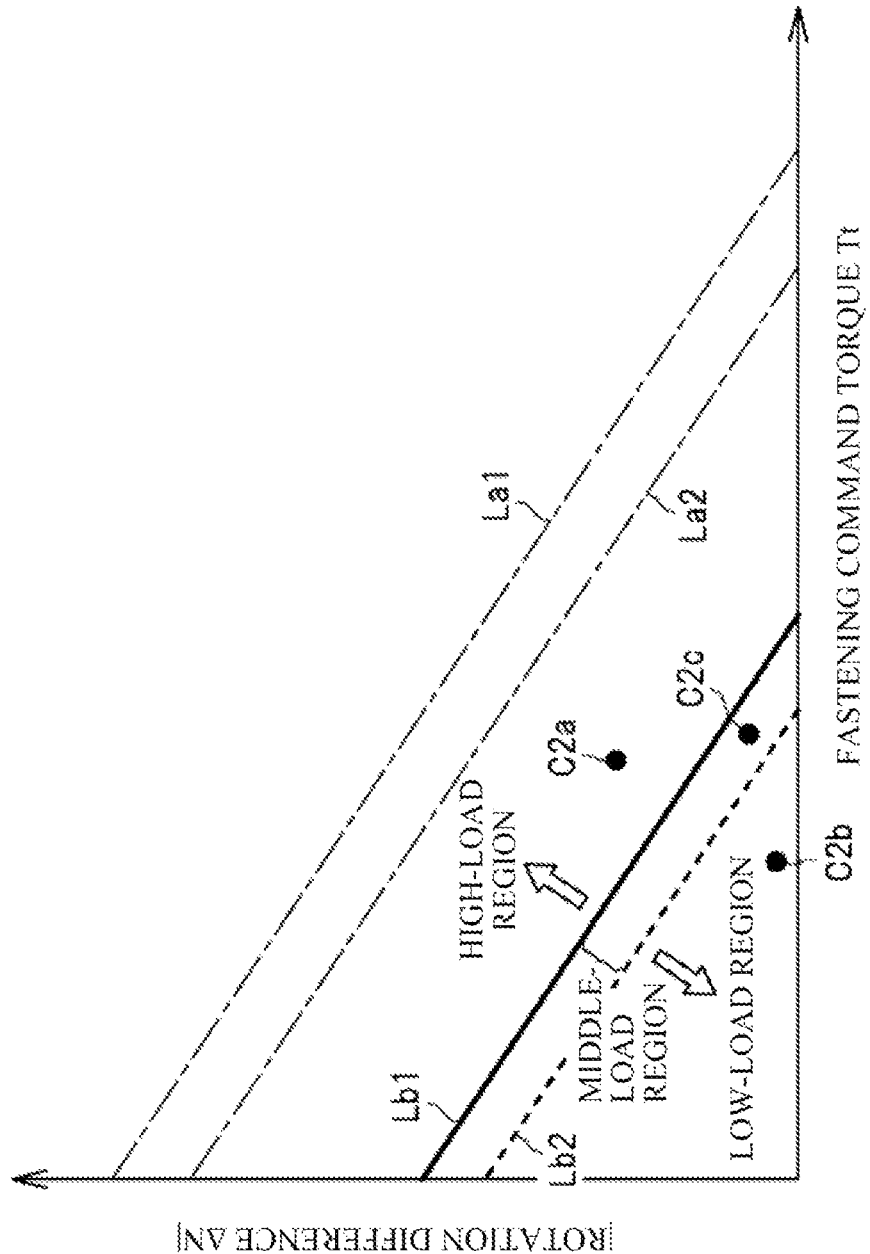
FIG. 12 is diagram illustrating exemplary characteristic line to be used in a second lubricating state of the transfer clutch in which the amount of lubricating oil is insufficient, according to one example embodiment of the disclosure.
Figure 13:
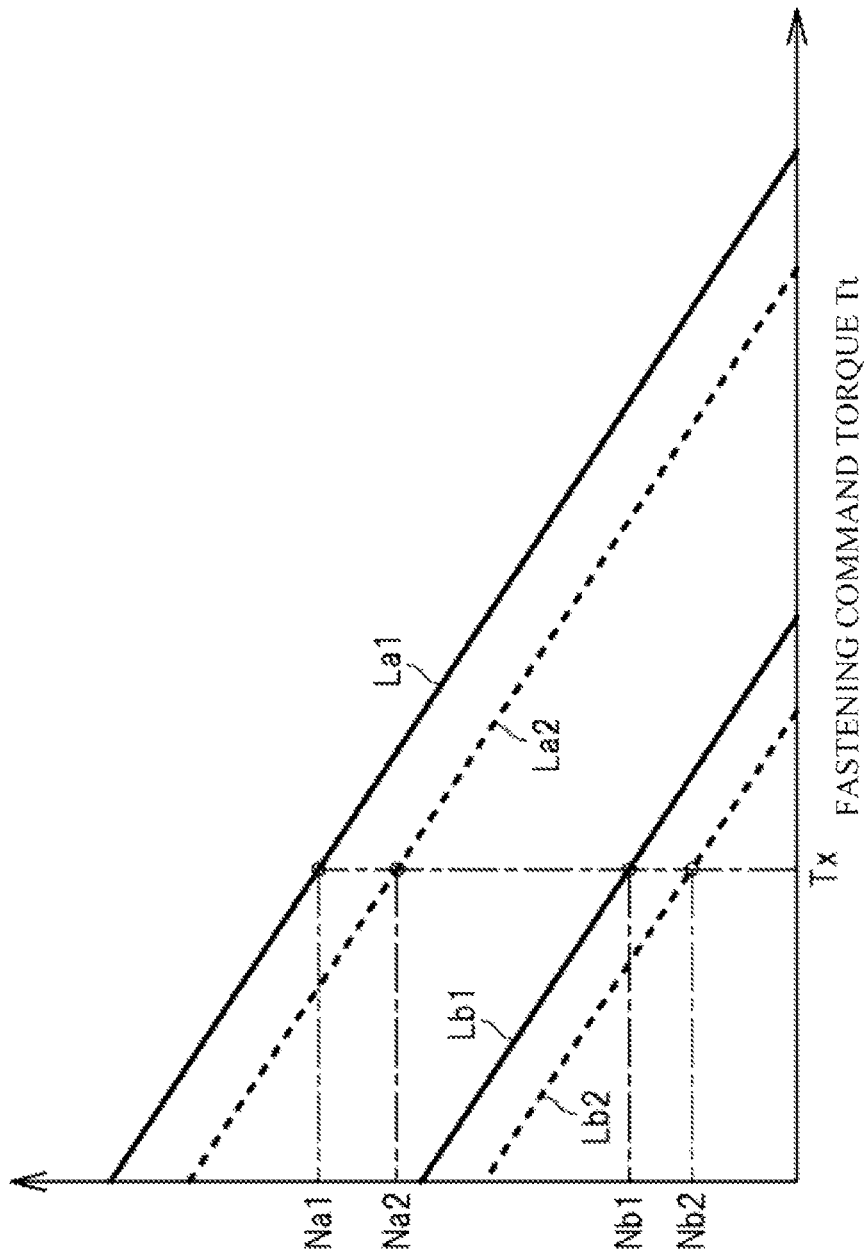
FIG. 13 is a diagram illustrating an exemplary rotation threshold obtained from characteristic lines according to one example embodiment of the disclosure.

FIGS. 9 and 10 are flowcharts of an exemplary procedure for the clutch load determination. The flowcharts illustrated in FIGS. 9 and 10 are connected to each other at a position indicated by a reference character A. FIG. 11 illustrates exemplary characteristic lines La1 and La2 to be used in the first lubricating state of the transfer clutch 24 in which the amount of lubricating oil is appropriate. FIG. 12 illustrates exemplary characteristic lines Lb1 and Lb2 to be used in the second lubricating state of the transfer clutch 24 in which the amount of lubricating oil is insufficient. FIG. 13 illustrates exemplary rotation thresholds obtained from the characteristic lines La1, La2, Lb1, and Lb2. Note that a rotation difference (a slip amount) $\Delta N$ of the transfer clutch 24 to be described later may be a rotation speed difference between a rotation speed of the transmission output shaft 26 and a rotation speed of the rear-wheel output shaft 15, that is, a rotation speed difference between an input rotation speed of the transfer clutch 24 and an output rotation speed of the transfer clutch 24. A fastening command torque Tt of the transfer clutch 24 may be a control target value to be sent from the control system 70 to the electromagnetic driving unit 47 of the transfer clutch 24.

As illustrated in FIG. 9, in Step S30, the control system 70 may determine whether the appropriate oil amount flag FLa has been set, that is, whether the transfer clutch 24 is in the first lubricating state in which the amount of lubricating oil is appropriate. When the control system 70 determines that the transfer clutch 24 is in the first lubricating state in which the amount of lubricating oil is appropriate (Step S30: Yes), the procedure may proceed to Step S31 in which the control system 70 calculates a load on the transfer clutch 24 (hereinafter referred to as a clutch load) based on the rotation difference $\Delta N$ and the fastening command torque Tt of the transfer clutch 24. After the control system 70 calculates the clutch load in Step S31, the procedure may proceed to Step S32 in which the control system 70 determines a region which the clutch load belongs to, based on the characteristic lines La1 and La2. As illustrated in FIG. 11, a region on and above the characteristic line La1 may be a high-load region, and a region below the characteristic line La2 may be a low-load region. A region below the characteristic line La1 and on and above the characteristic line La2 may be a middle-load region.

As illustrated in FIG. 9, in Step S33, the control system 70 may determine whether the clutch load belongs to the middle-load region. When the control system 70 determines that the clutch load belongs to the middle-load region (Step S33: Yes), the procedure may proceed to Step S34 in which the control system 70 determines whether a predetermined determination time has elapsed. When the control system 70 determines that the predetermined determination time has elapsed (Step S34: Yes), that is, when the clutch load has been maintained in the middle region for the predetermined determination time, the procedure may proceed to Step S35 in which the control system 70 sets a clutch protection flag FLb (FLb=1). The clutch protection flag FLb may be set when the transfer clutch 24 is to be protected from heat generation or the like. In contrast, when the control system 70 determines that the predetermined determination time has not elapsed (Step S34: No), the procedure may proceed to Step S31 in which the control system 70 calculates the clutch load based on the rotation difference $\Delta N$ and the fastening command torque Tt again.

When the control system 70 determines that the clutch load does not belong to the middle-load region (Step S33: No), the procedure may proceed to Step S36 in which the control system 70 determines whether the clutch load belongs to the high-load region. When the control system 70 determines that the clutch load belongs to the high-load region (Step S36: Yes), the procedure may proceed to Step S35 in which the control system 70 sets the clutch protection flag FLb (FLb=1). In contrast, when the control system 70 determines that the clutch load does not belong to the high-load region (Step S36: No), that is, when the clutch load belongs to the low-load region, the procedure may proceed to Step S37 in which the control system 70 cancels the clutch protection flag FLb (FLb=0). The clutch protection flag FLb may be cancelled when overheat generation of the transfer clutch 24 has not been caused and thus protection of the transfer clutch 24 is unnecessary.

As described above, when the transfer clutch 24 is in the first lubricating state in which the amount of lubricating oil is appropriate, the control system 70 may determine the magnitude of the clutch load based on the characteristic lines La1 and La2 and set the clutch protection flag FLb of the transfer clutch 24 based on a result of the determination. For example, as illustrated in FIG. 11, when the clutch load is calculated to be a clutch load Cla, the control system 70 may determine that the clutch load Cla belongs to the high-load region located on and above the characteristic line La1 and set the clutch protection flag FLb. When the clutch load is calculated to be a clutch load Clb, the control system 70 may determine that the clutch load Clb belongs to the low-load region located below the characteristic line La2 and cancel the clutch protection flag FLb. When the clutch load is calculated to be a clutch load C1c, the control system 70 may determine that the clutch load C1c belongs to the middle-load region located below the characteristic line La1 and on and above the characteristic line La2. When such a condition has been maintained for the predetermined time, the control system 70 may set the clutch protection flag FLb.

That is, when the transfer clutch 24 is in the first lubricating state in which the amount of lubricating oil is appropriate, the control system 70 may determine the magnitude of the rotation difference $\Delta N$ based on the rotation thresholds obtained from the characteristic lines La1 and La2 and set the clutch protection flag FLb of the transfer clutch 24 based on a result of the determination. For example, as illustrated in FIG. 13, when the fastening command torque Tt is calculated to be a torque Tx, the control system 70 may calculate rotation thresholds Na1 and Na2 based on the characteristic lines La1 and La2. In one embodiment, the rotation thresholds Na1 and Na2 may each serve as a "first threshold". When the rotation difference $\Delta N$ is larger than the rotation threshold Na1, the control system 70 may determine that the clutch load belongs to the high-load region located on and above the characteristic line La1 and set the clutch protection flag FLb.

When the rotation difference $\Delta N$ is smaller than the rotation threshold Na2, the control system 70 may determine that the clutch load belongs to the low-load region located below the characteristic line La2 and cancel the setting of the clutch protection flag FLb. When the rotation difference $\Delta N$ is smaller than the rotation threshold Na1 and larger than the rotation threshold Na2, the control system 70 may determine that the clutch load belongs to the middle-load region located below the characteristic line La1 and on and above the characteristic line La2. When such a condition has been maintained for the predetermined time, the control system 70 may set the clutch protection flag FLb.

As illustrated in FIGS. 9 and 10, when the control system 70 determines that the appropriate oil amount flag FLa is not set (Step S30: No), that is, when the control system 70 determines that the transfer clutch 24 is in the second lubricating state in which the amount of lubricating oil is insufficient, the procedure may proceed to Step S41. As illustrated in FIG. 10, the control system 70 may calculate the clutch load based on the rotation difference ΔN and the fastening command torque Tt of the transfer clutch 24 in Step S41. After the control system 70 calculates the clutch load in Step S41, the procedure may proceed to Step S42 in which the control system 70 determines a region which the clutch load belongs to, based on the characteristic lines Lb1 and Lb2. As illustrated in FIG. 12, a region on and above the characteristic line Lb1 may be a high-load region, and a region below the characteristic line Lb2 located below the characteristic line Lb1 may be a low-load region. A region below the characteristic line Lb1 and on and above the characteristic line Lb2 may be a middle-load region. The characteristic line Lb1 may be set at a position below the characteristic line La1 described above, and the characteristic line Lb2 may be set at a position lower than the characteristic line La2 described above.

As illustrated in FIG. 10, in Step S43, the control system 70 may determine whether the clutch load belongs to the middle-load region. When the control system 70 determines that the clutch load belongs to the middle-load region (Step S43: Yes), the procedure may proceed to Step S44 in which the control system 70 determines whether a predetermined determination time has elapsed. When the control system 70 determines that the predetermined determination time has elapsed (Step S44: Yes), that is, when the clutch load has been maintained in the middle region for the predetermined determination time, the procedure may proceed to Step S45 in which the control system 70 sets the clutch protection flag FLb (FLb=1). In contrast, when the control system 70 determines that the predetermined determination time has not elapsed (Step S44: No), the procedure may proceed to Step S41 in which the control system 70 calculates the clutch load based on the rotation difference ΔN and the fastening command torque Tt again.

When the control system 70 determines that the clutch load does not belong to the middle-load region (Step S43: No), the procedure may proceed to Step S46 in which the control system 70 determines whether the clutch load belongs to the high-load region. When the control system 70 determines that the clutch load belongs to the high-load region (Step S46: Yes), the procedure may proceed to Step S45 in which the control system 70 sets the clutch protection flag FLb (FLb=1). In contrast, when the control system 70 determines that the clutch load does not belong to the high-load region (Step S46: No), that is, when the control system 70 determines that the clutch load belongs to the low-load region, the procedure may proceed to Step S47 in which the control system 70 cancels the setting of the clutch protection flag FLb (FLb=0).

As described above, when the transfer clutch 24 is in the second lubricating state in which the amount of lubricating oil is insufficient, the control system 70 may determine the magnitude of the clutch load based on the characteristic lines Lb1 and L2 and set the clutch protection flag FLb based on a result of the determination. For example, as illustrated in FIG. 12, when the clutch load is calculated to be a clutch load C2a, the control system 70 may determine that the clutch load C2a belongs to the high-load region located on and above the characteristic line Lb1 and sets the clutch protection flag FLb. When the clutch load is calculated to be a clutch load C2b, the control system 70 may determine that the clutch load belongs to the low-load region located below the characteristic line Lb2 and cancel the setting of the clutch protection flag FLb. When the clutch load is calculated to be a clutch load C2c, the control system 70 determines that the clutch load C2c belongs to the middle-load region located below the characteristic line Lb1 and on and above the characteristic line Lb2. When such a condition has been maintained for the predetermined time, the control system 70 may set the clutch protection flag FLb.

That is, when the transfer clutch 24 is in the second lubricating state in which the amount of lubricating oil is insufficient, the control system 70 may determine the magnitude of the rotation difference ΔN based on the rotation thresholds obtained from the characteristic lines Lb1 and Lb2 and set the clutch protection flag FLb of the transfer clutch 24 based on a result of the determination. For example, as illustrated in FIG. 13, when the fastening command torque Tt is calculated to be a torque Tx, the control system 70 may calculate rotation thresholds Nb1 and Nb2 based on the characteristic lines Lb1 and Lb2. In one embodiment, the rotation thresholds Nb1 and Nb2 may each serve as a "second threshold". When the rotation difference ΔN is larger than the rotation threshold Nb1, the control system 70 may determine that the clutch load belongs to the high-load region located on and above the characteristic line Lb1 and set the clutch protection flag FLb.

When the rotation difference ΔN is smaller than the rotation threshold Nb2, the control system 70 may determine that the clutch load belongs to the low-load region located below the characteristic line Lb2 and cancel the setting of the clutch protection flag FLb. When the rotation difference ΔN is smaller than the rotation threshold Nb1 and larger than the rotation threshold Nb2, the control system 70 may determine that the clutch load belongs to the middle-load region located below the characteristic line Lb1 and on and above the characteristic line Lb2. When such a condition has been maintained for the predetermined time, the control system 70 may set the clutch protection flag FLb. As illustrated in FIG. 13, when the fastening command torque Tt is a torque Tx, the rotation threshold Nb1 may be set to a smaller value than the rotation threshold Na1, and the rotation threshold Nb2 may be set to a smaller value than the rotation threshold Na2.

Figure 14:
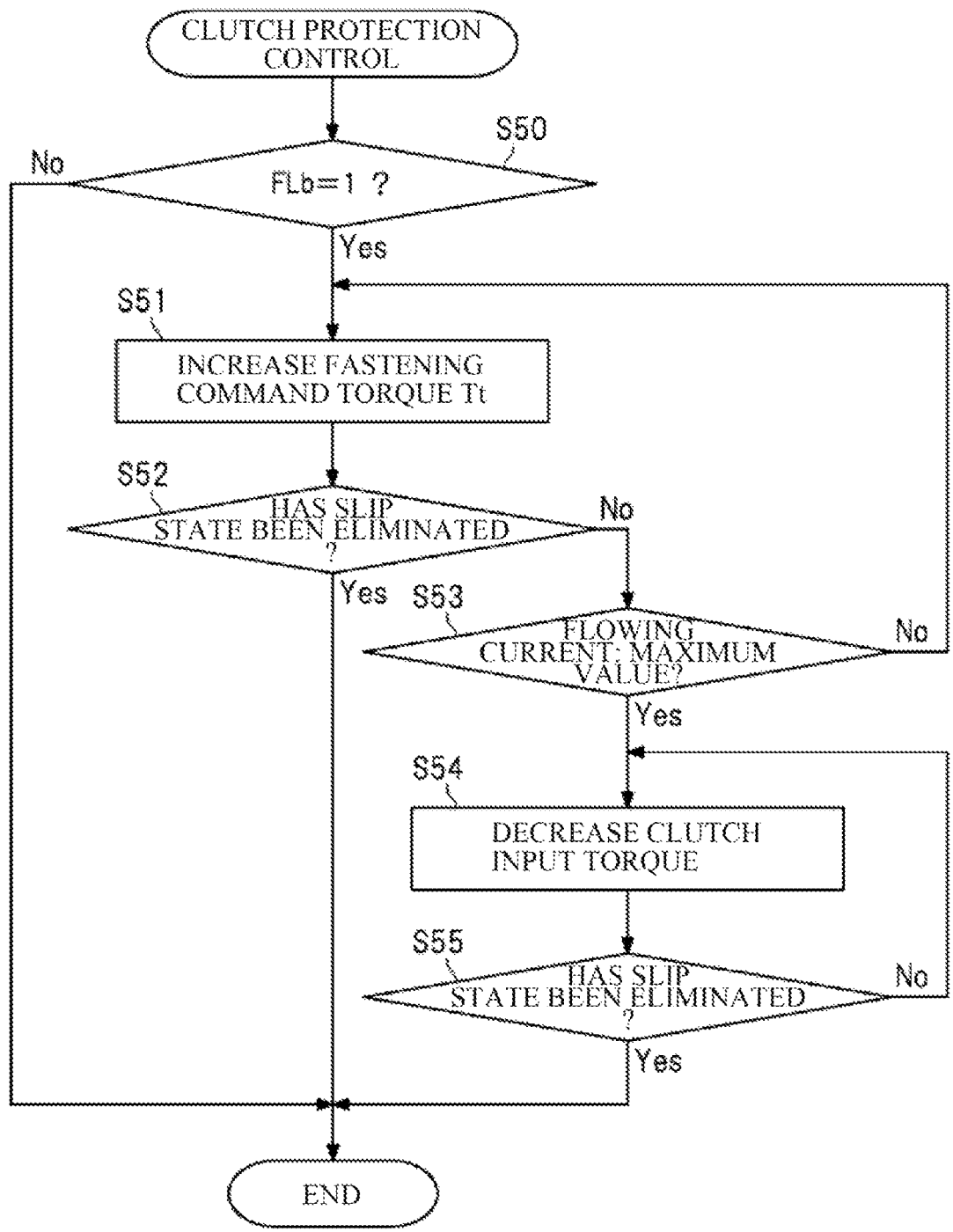
FIG. 14 is a flowchart of an exemplary procedure for clutch protection control according to one example embodiment of the disclosure.

Next, a description is given of the clutch protection control adapted to suppress the occurrence of the slip state of the transfer clutch 24. FIG. 14 is a flowchart of an exemplary procedure for the clutch protection control. As illustrated in FIG. 14, the control system 70 may determine whether the clutch protection flag FLb has been set, that is, whether the transfer clutch 24 is to be protected from heat generation or the like in Step S50. When it is determined that the transfer clutch 24 is to be protected (Step S50: Yes), the procedure may proceed to Step S51 in which the control system 70 increases the fastening command torque Tt of the transfer clutch 24 by a predetermined amount.

After the control system 70 increases the fastening command torque Tt in Step S51, the procedure may proceed to Step S52 in which the control system 70 determines whether the slip state of the transfer clutch 24 has been eliminated, that is, whether the rotation difference ΔN of the transfer clutch 24 has been eliminated. When it is determined that the slip state has been eliminated (Step S52: Yes), overheat generation or the like of the transfer clutch 24 may be eliminated, and the procedure may thus exit the routine.

When it is determined that the slip state of the transfer clutch 24 has not been eliminated (Step S52: No), the procedure may proceed to Step S53 in which the control system 70 determines whether the amount of a flowing current to the electromagnetic driving unit 47 has reached a maximum value. When it is determined that the amount of the flowing current has not reached the maximum value (Step S53: No), the procedure may return to Step S51 in which the control system 70 increases the fastening command torque Tt of the transfer clutch 24 by the predetermined amount. The flowing current may reach the maximum value in Step S53 when the fastening torque of the transfer clutch 24 reaches a maximum value.

When it is determined that the amount of the flowing current has reached the maximum value (Step S53: Yes), the procedure may proceed to Step S54 in which the control system 70 controls the engine 12 and the motor generator 13 to decrease an input torque to be applied to the transfer clutch 24. In Step S54, the control system 70 may decrease the input torque to be applied to the transfer clutch 24 by decreasing one or both of an engine torque and a motor torque.

After the input torque of the transfer clutch 24 is decreased in Step S54, the procedure may proceed to Step S55 in which the control system 70 determines whether the slip state of the transfer clutch 24 has been eliminated, that is, whether the rotation difference $\Delta N$ of the transfer clutch 24 has been eliminated. When it is determined by the control system 70 that the slip state has been eliminated (Step S55: Yes), overheat generation or the like of the transfer clutch 24 may be eliminated, and the procedure may thus exit the routine. In contrast, when it is determined by the control system 70 that the slip state has been not eliminated (Step S55: No), the procedure may proceed again to Step S54 in which an input torque to be applied to the transfer clutch 24 is decreased.

As described above, when the rotation difference (slip amount) $\Delta N$ of the transfer clutch 24 becomes larger than the first threshold determined based on the characteristic lines La1 and La2 while the transfer clutch 24 is in the first lubricating state in which the amount of lubricating oil is appropriate, the control system 70 executes the clutch protection control adapted to suppress the occurrence of the slip state of the transfer clutch 24. In addition, when the rotation difference (slip amount) $\Delta N$ of the transfer clutch 24 becomes larger than the second threshold determined based on the characteristic lines Lb1 and Lb2 while the transfer clutch 24 is in the second lubricating state in which the amount of lubricating oil is insufficient, the control system 70 executes the clutch protection control adapted to suppress the occurrence of the slip state of the transfer clutch 24. The characteristic line Lb1 may be set to a smaller value than the characteristic line La1, and the characteristic line Lb2 may be set to a smaller value than the characteristic line La2. Accordingly, while the transfer clutch 24 is in the second lubricating state in which the amount of lubricating oil is insufficient, it is possible to execute the clutch protection control at an early timing. It is therefore possible to appropriately protect the transfer clutch 24.

In the example illustrated in FIG. 11, the characteristic lines La1 and La2 may be used when the transfer clutch 24 is in the first lubricating state in which the amount of lubricating oil is appropriate. However, this is a non-limiting example, and one of these characteristic lines (e.g., only the characteristic line La1) may be used. Likewise, in the example illustrated in FIG. 12, the characteristic lines Lb1 and Lb2 may be used when the transfer clutch 24 is in the second lubricating state in which the amount of lubricating oil is insufficient. However, this is a non-limiting example, and one of these characteristic lines (e.g., only the characteristic line Lb1) may be used. That is, the control system 70 may execute the clutch protection control when the rotation difference $\Delta N$ of the transfer clutch 24 becomes larger than the first threshold determined based on the characteristic line La1 while the transfer clutch 24 is in the first lubricating state in which the amount of lubricating oil is appropriate. In addition, the control system 70 may execute the clutch protection control when the rotation difference $\Delta N$ of the transfer clutch 24 becomes larger than the second threshold determined based on the characteristic line Lb1 while the transfer clutch 24 is in the second lubricating state in which the amount of lubricating oil is insufficient.

As illustrated in FIG. 13, the first threshold determined based on the characteristic lines La1 and La2 may become smaller as the fastening command torque Tt of the transfer clutch 24 increases, that is, as the fastening torque of the transfer clutch 24 increases. Further, as illustrated in FIG. 13, the second threshold determined based on the characteristic lines Lb1 and Lb2 may become smaller as the fastening command torque Tt of the transfer clutch 24 increases, that is, as the fastening torque of the transfer clutch 24 increases. Accordingly, it is possible to execute the clutch protection control at an appropriate timing.

In the example illustrated in FIG. 11, the first threshold determined based on the characteristic lines La1 and La2 may change depending on the fastening command torque Tt; however, this is a non-limiting example. Alternatively, the control system 70 may execute the clutch protection control when the rotation difference $\Delta N$ becomes larger than the first threshold which is a fixed value while the transfer clutch 24 is in the first lubricating state in which the amount of lubricating oil is appropriate. Likewise, in the example illustrated in FIG. 12, the second threshold determined based on the characteristic lines Lb1 and Lb2 may change depending on the fastening command torque Tt; however, this is a non-limiting example. Alternatively, the control system 70 may execute the clutch protection control when the rotation difference $\Delta N$ becomes larger than the second threshold which is a fixed value while the transfer clutch 24 is in the second lubricating state in which the amount of lubricating oil is insufficient.

Note that the disclosure is not limited to the foregoing example embodiments and various modification may be made without departing from the gist of the disclosure. In the above description, the control system 70 may include the multiple control units including the transmission control unit 71, the engine control unit 72, the motor control unit 73, and the vehicle control unit 80; however, this is a non-limiting example. Alternatively, the control system 70 may include a single control unit. Further, the power unit 14 illustrated in the attached drawings may be a power unit for a hybrid vehicle that includes the engine 12 and the motor generator 13 as power sources; however, this is a non-limiting example. The power unit 14 may be a power unit that includes only the engine 12 as a power source, or a power unit for an electric vehicle that includes only the motor generator 13 as a power source.

In the above description, the transfer clutch 24 may be used as a friction clutch that controls the torque distribution ratio between the front wheel 20 and the rear wheel 18; however, this is a non-limiting example. Alternatively, a differential limiting clutch in a center differential mechanism may be used as the friction clutch that controls the torque distribution ratio between the front wheel 20 and the rear wheel 18, for example. Further, in the above description, the transfer clutch 24 may be controlled by the electromagnetic driving unit 47; however, this is a non-limiting example. Alternatively, the transfer clutch 24 may be controlled by a piston which is controlled depending on hydraulic pressure, for example. Further, in the example illustrated in the attached drawings, the transfer clutch 24 may be a multiple disk clutch; however, this is a non-limiting example. Alternatively, the transfer clutch 24 may be a single disk clutch.

In the clutch protection control described above, the occurrence of the slip state of the transfer clutch 24 may be suppressed by increasing the fastening torque of the transfer clutch 24 and decreasing the input torque of the transfer clutch 24; however, this is a non-limiting example. Alternatively, in the clutch protection control, the occurrence of the slip state of the transfer clutch 24 may be suppressed by decreasing the fastening toque of the transfer clutch 24 to release the transfer clutch 24, for example. In addition, the start-up switch 90 is not limited to a physical switch that mechanically operates and may alternatively be a virtual start-up switch displayed on a touch panel or the like.

According to the foregoing example embodiments of the disclosure, it is possible to appropriately protect the friction clutch.

The invention claimed is:

1. A vehicle driving apparatus to be applied to a vehicle, the vehicle driving apparatus comprising:
    a friction clutch disposed in a power transfer path coupling a power source of the vehicle to drive wheels of the vehicle, the friction clutch being configured to control a torque distribution ratio between the drive wheels;
    a lubricating system comprising an oil pump configured to discharge oil, the lubricating system being configured to supply the oil to the friction clutch; and
    a control system comprising a processor and a memory that are communicably coupled to each other, the control system being configured to execute clutch protection control adapted to suppress an occurrence of a slip state of the friction clutch, wherein
    the friction clutch is configured to be brought into a first lubricating state or a second lubricating state in which an amount of the oil is smaller than the amount of the oil in the first lubricating state, and
    the control system is configured to
        execute the clutch protection control when a slip amount of the friction clutch becomes larger than a first threshold while the friction clutch is in the first lubricating state, and
        execute the clutch protection control when the slip amount of the friction clutch becomes larger than a second threshold while the friction clutch is in the second lubricating state, the second threshold being smaller in the slip amount of the friction clutch than the first threshold.

2. The vehicle driving apparatus according to claim 1, wherein the control system is configured to determine that the friction clutch is in the second lubricating state when a supply stop time during which a supply of the oil to the friction clutch is stopped becomes longer than a time threshold.

3. The vehicle driving apparatus according to claim 2, wherein the supply stop time comprises a time from a timing at which a start-up switch of the control system is turned off by an occupant of the vehicle to a timing at which the start-up switch is turned on by the occupant.

4. The vehicle driving apparatus according to claim 1, wherein the first threshold and the second threshold are set to respective smaller values as a fastening torque of the friction clutch increases.

5. The vehicle driving apparatus according to claim 1, wherein
    the oil pump comprises a rotor coupled to both of a crank shaft of an engine and a rotary shaft in the power transfer path, the engine serving as the power source of the vehicle, and
    the lubricating system is configured to stop the supply of the oil to the friction clutch when a traveling speed of the vehicle becomes lower than a speed threshold while the engine is being stopped.

* * * * *